United States Patent [19]

Ueda et al.

[11] Patent Number: 4,844,479
[45] Date of Patent: Jul. 4, 1989

[54] STRUCTURE OF A GLAND PACKING BOX

[75] Inventors: Takahisa Ueda; Hiroyuki Sasakura; Takashi Ikeda, all of Sanda, Japan

[73] Assignee: Nippon Pillar Packing Co., Ltd., Osaka, Japan

[21] Appl. No.: 112,362

[22] Filed: Oct. 26, 1987

[30] Foreign Application Priority Data

Nov. 7, 1986 [JP] Japan .................................. 61-266469

[51] Int. Cl.$^4$ ............................................ E21B 33/00
[52] U.S. Cl. ..................................... 277/4; 277/188 R
[58] Field of Search ...................... 277/3, 4, 12, 81, 88, 277/89, 188

[56] References Cited

U.S. PATENT DOCUMENTS

| | | | |
|---|---|---|---|
| 1,347,351 | 7/1920 | Murray | 277/188 R |
| 1,868,199 | 7/1932 | Pelterie | 277/188 R |
| 2,054,369 | 9/1936 | Francis | 277/81 |
| 2,394,609 | 2/1946 | Hardesty | 277/4 |
| 2,444,211 | 6/1948 | Wagner | 277/4 |
| 2,667,776 | 2/1954 | Kortenpeter et al. | 277/4 |
| 3,097,855 | 7/1963 | Allen | 277/188 R |

FOREIGN PATENT DOCUMENTS

| | | | |
|---|---|---|---|
| 1147802 | 6/1957 | France | 277/4 |
| 956237 | 4/1964 | United Kingdom | 277/8 |

Primary Examiner—Donald A. Griffin
Attorney, Agent, or Firm—Jones, Tullar & Cooper

[57] ABSTRACT

A structure of a gland packing box is enhanced in the lubricating function and cooling function of the seal part, by forming at least one disclocating part for partly dislocating in the axial direction a gland packing of the gland packing box. The dislocating part is located on the fitting face of a gland packing holding member for fitting in the axial direction the gland packing externally mounted on a rotary shaft in the packing box. The dislocation causes part of the annular gap formed between the inside of the gland packing holding member and the outside of the rotary shaft to overlap with the internal surface of the gland packing in the circumferential direction, and forces a fluid to be sent into the inner surface of the overlapping gland packing along with rotation of the rotary shaft.

16 Claims, 10 Drawing Sheets

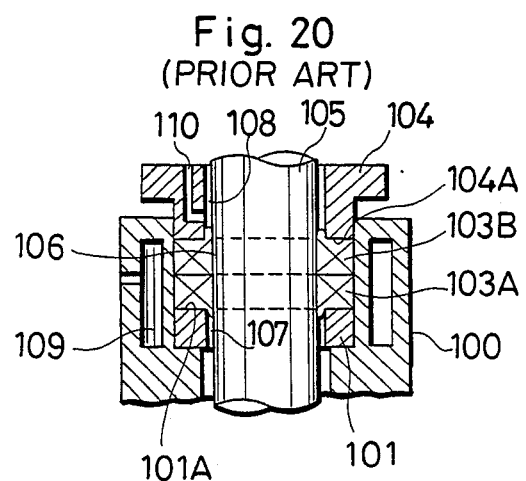

STRUCTURE OF A GLAND PACKING BOX

BACKGROUND OF THE INVENTION

1. Field of the Invention:

This invention relates to a gland packing box composed in a shaft seal part of a hydraulic machine, and more particularly to a structure of a gland packing box suppressing the power loss as much as possible while enhancing the lubricating function and cooling function of the seal part.

2. Description of the Prior Art:

As a general conventional structure of a gland packing, the construction as shown in FIG. 20 is known. In the drawing, numeral 100 is a packing box formed at an end of, for example, a pump casing, 101 is a neck bushing, 103A, 103B are gland packings, 104 is a packing gland, and 105 is a rotary shaft, in which the gland packings 103A, 103B are pressed in the axial direction with a specified tightening pressure by the neck brshing 101 inserted deep in the packing box 100 and the packing gland 104 with the end part set in the opening of packing box 100, thereby maintaining a sealing for the rotary shaft 105.

The structure of the gland packing box is so designed as to prevent abnormal wear of the rotary shaft 105 or seizure of seal part 106 due to dry operation, by allowing fluid from the seal part 106 between the outside of the rotary shaft 105 and the inside of the gland packings 103A, 103B to, and by providing this escaping fluid with a lubricating function and a cooling function.

In the conventional structure of a packing box stated above, however, the gland packing fitting faces 101A, 104A abutting against the gland packings 103A, 103B of the neck bishing 101 and packing gland 104 respectively, are formed in a shape to be perpendicular and uniform to the axial line of the rotary shaft 105, and the gland packing 103A, 103B are held by these packing fitting faces 101A, 104A, so that the axial ends of the gland packings 103A, 103B naturally cross perpendicularly and uniformly to the axial line of the rotary shaft 105.

Therefore, a tiny annular gap 107 formed between the inside of the neck bishing 101 and the outside of the rotary shaft 105 only corresponds to the axial end of the gland packing 103A, and does not overlap with the inside of the gland packing 103A in the circumferential direction.

Accordingly, the escaping fluid functioning as lubricant and coolant is sent into the seal part 106 only through the inner end in the axial direction of the tiny annular gap 107. However, since it is designed to press the inside of the gland packings 103A, 103B to the outside of the rotary shaft 105 and keep a favorable sealing performance by tightening the packing gland 104 in the direction of the neck bushing 101 with a specified tightening pressure, the inside of the gland packings 103A, 103B and the outside of the rotary shaft 105 forming the seal part 106 is in a tight contact state, and it is practically difficult to send the escaping fluid only by the fluid pressure in the casing into such a seal part 106, and the leak flow is diminutively limited, and the lubricating function and cooling function cannot be exhibited effectively.

Still more, if the tightening pressure of the packing gland 104 is excessive, or when the inner peripheral edge of the gland packing 103 projects into the tiny annular gap 107 due to the effect of internal stress of the gland packings 103A, 103B, or the like, this projecting part locally becomes high in density, and the leak flow into the seal part 106 is extremely limited, and the lubricating function and cooling function are lowered, which may lead to problems such as abnormal wear of the rotary shaft, seizure of the seal part due to dry operation, and other troubles.

Such problems also occur in the part of a tiny annular gap 108 formed between the inside of packing gland 104 and the outside of rotary shaft 105 in FIG. 20.

Hence, by forming a cooling jacket 109 on the peripheral wall of the packing box 100, for example, circulating cooling water and forming a passage 110 communicating with the tiny annular gap 108 in the packing gland 104, and introducing through this passage 110, for example, cooling water into the tiny annular gap 108 the cooling effect is. enhanced In spite of these effects, however, since the cooling jacket 109 is only to cool the gland packings 103A, 103B directly, much of a cooling effect on the seal part 106 is not expected, and the lubricating effect is not expected at all.

Incidentally, if the cooling water is led into the tiny annular gap 108 through the passage 110, only the slight portion corresponding to the tiny annular gap 108 or the projecting portion of the gland packing 103B is directly cooled by this cooling water, and the cooling effect and lubricating effect on the seal part 106 cannot be expected as in the case of the cooling jacket 109 above.

SUMMARY OF THE INVENTION

This invention, in the light of the above situations, is hence intended to present a structure of a gland packing box capable of preventing occurrence of abnormal wear of the rotary shaft, seizure of the seal part, or the like, and suppressing the power loss as much as possible, by sending a fluid into the seal part effectively to enhance the lubricating function and the cooling function.

It is another object of this invention to present a structure of a gland packing box which can be easily applied to the existing structure of a gland packing box, and can enhance the lubricating function and cooling function effectively.

What is characteristic of the structure of the gland packing box of this invention is that at least one dislocating part for partially dislocating the gland packing in the axial direction is formed on the fitting face of a gland packing holding member, by providing with the gland packing holding member for holding in the axial direction the packing box and the gland packing externally fitted on the rotary shaft in the packing box.

In such a structure, the partially dislocated portion of the gland packing in the axial direction overlaps with the other inner surface of the partially dislocated gland packing in the circumferential direction, so that the escaping fluid is forced to be sent into the inside of the gland packing which is overlapped along with the rotation of the rotary shaft, and the lubricating performance and cooling performance on the inner surface of the gland packing are effectively improved.

Another characteristic of the structure of the gland packing box of this invention is that the entire fitting face of the gland packing holding member is formed at the same angle with respect to the axial direction of the holding member.

In thus construction, one side of the gland packing abutting against the gland packing holding member is uniformly pressed over the entire peripheral direction, and when the dislocating portion for partially dislocating the gland packing in the axial direction is formed on the fitting face of the gland packing holding member, the shaft sealing performance is not disturbed.

It is a further characteristic of the structure of the gland packing box of this invention that the gland packing holding member is composed of a pair of neck bushings, and that one of the neck bushings is disposed between the gland packing and the packing gland for fixing in the packing box.

When thus constructed, by means of the pair of neck bushings in which the dislocating portion is formed, the structure may be easily applied to the existing packing box and packing gland.

The most preferable embodiment to be applied to such an existing product is to dispose an annular plate member having at least one dislocating portion for partially dislocating the gland packing in the axial direction between the gland packing and the gland packing holding member.

That is, if the means for partially dislocating the gland packing in the axial direction is shaped like a plate, it does not require a wide space, and it can be easily incorporated into an existing product. What is more, the dislocating portion is easy to fabricate and is inexpensive.

Many other characteristics and effects of this invention will be more easily understood and appreciated from the detailed description of the invention given in conjunction with the appended drawings.

BRIEF DESCRIPTION OF THE DRAWINGS

FIG. 20 is a sectional view showing the structure of a conventional gland packing box.

DESCRIPTION OF THE PREFERRED EMBODIMENTS

Figure 1:
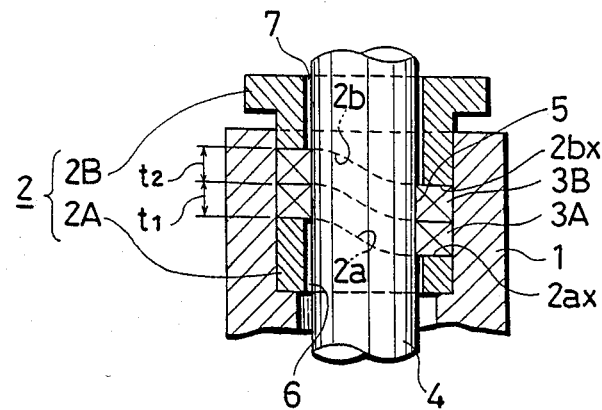
FIG. 1 is a sectional view showing a first embodiment of the structure of a gland packing box according to this invention.

Referring now to the drawings, the preferred embodiments of this invention are described below.

FIG. 1 is a sectional view showing a first embodiment of the structure of a gland packing box of this invention, in which numeral 1 denotes a packing box, being formed at one end of, for example, a pump casing. Numeral 2 is a gland packing holding member, being composed of a neck bushing 2A inserted deep in the packing box 1 and a packing gland 2B with its front end fitted into the opening in the packing box 1, and gland packings 3A, 3B are held in the axial direction by the gland packing holding member 2 in the packing box 2 and are externally fitted on a rotary shaft 4.

That is, one end of the gland packing 3A in the axial direction abuts against the fitting face 2A of the neck bushing 2A, and the other end of the gland packing 3B in the axial direction abuts against the fitting face 2b of the packing gland 2B. By tightening the packing gland 2B with a specified tightening pressure by a tightening function (not shown), the inside of the gland packings 3A, 3B are brought in tight contact with the outside of the rotary shaft 4, and a seal part 5 is formed by the inside of the gland packings 3A, 3B and the outside of the rotary shaft 4.

On the fitting faces 2a, 2b of the neck bushing 2A and packing gland 2B for composing the gland packing holding member 2, dislocating parts 2ax, 2bx for dislocating the gland packings 3A, 3B in the axial direction are formed. That is, the dislocating part 2ax on the fitting face 2a in the neck bushing 2A is a curved surface (see FIG. 2) moderately dislocating downward for a portion of the dimension $t_1$ in the axial direction of the gland packing 3A with respect to each of the front and rear faces (only the rear face is shown in FIG. 1) linking one side (the left side in the drawing) of the fitting face 2a and the other side (right side), whereas the dislocating part 2bx on the fitting face 2b in the packing gland 2B is a curved surface (see FIG. 2) moderately dislocating downward for a portion of the dimension $t_2$ in the axial direction of the gland packing 2B with respect to each of the front and rear faces linking one side and the other side, similarly to the dislocating part 2ax.

Therefore, since the gland packings 3A, 3B are held by the fitting faces 2a, 2b of the gland packing holding member 2 composed of the neck bushing 2A and packing gland 2B provided with the dislocating parts 2ax, 2bx, it is dislocated partially in the axial direction by the portion of the dimension $t_1$, $t_2$ in the axial direction ($t_1 = t_2$).

Figure 2:
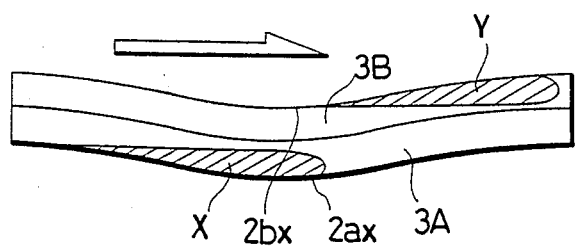
FIG. 2 is a development of the gland packing for explaining the overlapped portion of the gland packing in FIG. 1 in the circumferential direction.

In the above construction, the tiny annular gap 6 formed between the inside of the neck bushing 2A and the outside of the rotary shaft 4 overlaps with the region indicated by the oblique line X in FIG. 2 on the inner surface of the gland packing 3A in the circumferential direction in the upper part of the left side in FIG. 1. Accordingly, the fluid in the gap 6 is forced to be sent as an escaping fluid into the region shown by region X along with the rotation of the rotary shaft 4, and from this region X, a large volume of the fluid uniformly distributes in the seal part 5, so that the lubricating function and cooling function are enhanced.

On the other hand, the tiny annular gap 7 formed between the inside of the packing gland 2B and the outside of the rotary shaft 4 overlap with the region indicated by the oblique line Y in FIG. 2 in the inner surface of the gland packing 2B in the circumferential direction in the lower part of the right side shown in FIG. 1. Therefore, the liquid escaping into the annular tiny gap 7 from the neck bushing 2A side to the seal part 5 is forced to be sent into the region indicated by Y along with the rotation of the rotary shaft 4, so that this part is effectively lubricated and cooled.

Figure 3:
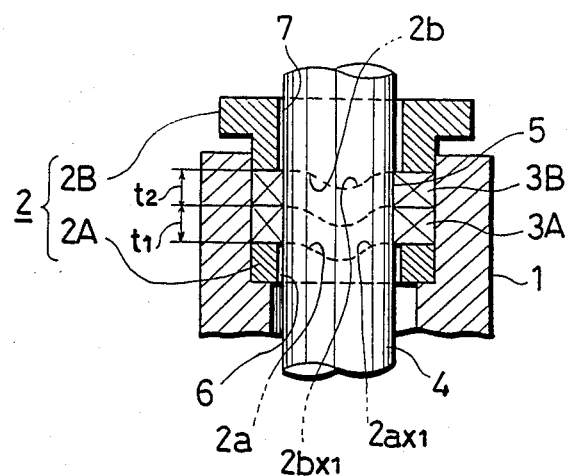
FIG. 3 is a sectional view showing a second embodiment of the structure of a gland packing box according to this invention.
Figure 4:
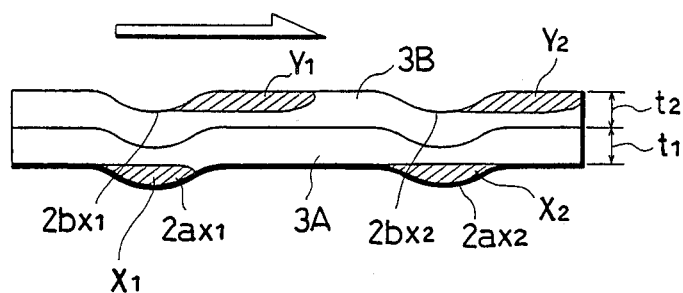
FIG. 4 is a development of the gland packing for explaining the overlapped portion of the gland packing in FIG. 3 in the circumferential direction.

FIG. 3 and FIG. 4 indicate a second embodiment of this invention, in which pairs of dislocating parts $2ax_1$, $2ax_2$, $2bx_1$, $2bx_2$ for deviating the gland packings 3A, 3B in the axial direction are formed on the fitting faces 2a, 2b of the neck bushing 2A and packing gland 2B to compose the gland packing holding member 2. That is, the dislocating parts $2ax_1$, $2ax_2$ on the fitting face 2a at the neck bushing 2A are curved surfaces partly dislocating downward for the portion corresponding to about half of the dimension $t_1$ in the axial direction of the gland packing 3A from the vicinity of the middle part to the middle part of both front and rear faces (only the rear face is shown in FIG. 3) of the fitting face 2a, whereas the dislocating parts $2bx_1$, $2bx_2$ on the fitting face 2b at the packing gland 2B are curved surfaces dislocating downward for the portion corresponding to about half of the dimension $t_2$ in the axial direction of the gland packing 3B from the vicinity of the middle part to the middle part of the front and rear faces of the fitting face 2b similarly to the dislocating parts $2ax_1$, $2ax_2$.

Therefore, since the gland packings 2A, 2B are held by the fitting faces 2a, 2b of the gland packing holding member 2 composed of the neck bushing 2A and packing gland 2B having dislocating parts $2ax_1$, $2ax_2$, $2bx_1$, $2bx_2$, it is dislocated in the axial direction by the portion corresponding to about half of the dimensions $t_1$, $t_2$ in the axial direction at the two front and rear positions on the circumference, and the tiny annular gap 6 in the neck bushing 2A overlaps with the region indicated by oblique lines $X_1$, $X_2$ in FIG. 4 in the inner surface of the gland packing 3A in the circumferential direction in the upper part of the right and left sides in FIG. 3. On the other hand, the tiny annular gap 7 in the packing gland 2B overlaps with the region indicated by oblique lines $Y_1$, $Y_2$ in FIG. 4 in the inner surface of the gland packing 3B in the circumferential direction in the lower part of the right and left sides in FIG. 3.

Accordingly, by the same reason as in the first embodiment, the fluid is forced to be sent into the region indicated by $X_1$, $X_2$ as a leaking fluid, and the fluid escaping to the lower part of the tiny annular gap 7 through the seal part 5 is forced to be sent into the region indicated by $Y_1$, $Y_2$, so that the lubricating function and cooling function are enhanced the same as in the first embodiment.

Figure 5:
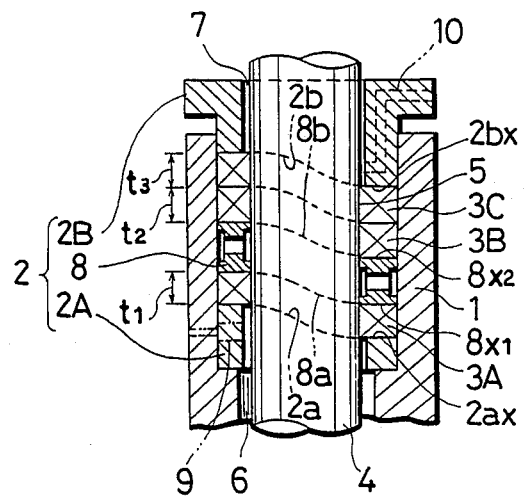
FIG. 5 is a sectional view showing a third embodiment of the structure of a gland packing box according to this invention.

FIG. 5 refers to a third embodiment, in which three gland packings 3A, 3B, 3C are used, and a lantern ring 8 is placed between the gland packings 3A and 3B. The gland packing holding member 2 is composed of the neck bushing 2A, packing gland 2B, and lantern ring 8, and dislocating parts $2ax$, $2bx$, $8x_1$, $8x_2$ formed as curved surfaces dislocating gently downward for the portion of the dimensions $t_1$, $t_2$, $t_3$ ($t_1 = t_2 = t_3$) in the axial direction of the gland packings 3A, 3B, 3C are formed on the respective fitting faces 2, 2b, 8a, 8b. As thus constructed, the lubricating function and cooling function is improved particularly in the middle part of the longitudinal direction of the seal part 5 by the fluid charged into the lantern ring 8, whereas both ends of the seal part 5 in the longitudinal direction are effectively cooled and lubricated by disposing a coolant feed passage 9 communicating with the gap 6 inside the neck bushing 2A and another coolant feed passage 10 communicating with the gap 7 in the packing gland 2B as indicated by virtual lines.

Figure 6:
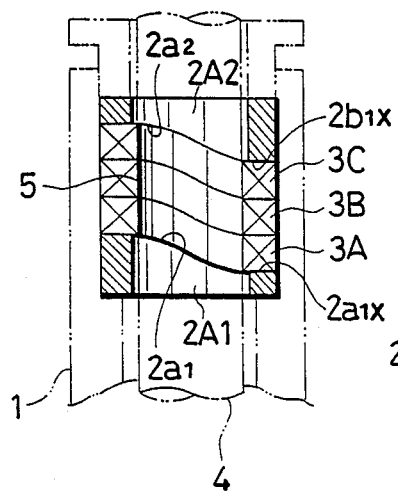
FIG. 6 is a sectional view of essential parts showing a fourth embodiment of the structure of a gland packing box according to this invention.

FIG. 6 shows a fourth embodiment of this invention, in which gland packings 3A, 3B, 3C are held by the neck bushing 2A1 inserted deep into the packing box 1 and the ring 2A2 inserted near the opening of the packing box 1, and dislocating parts $2a_{1x}$, $2b_{1x}$ similar to, for example, those in the first embodiment are formed on the fitting faces $2a1$, $2a2$ of the neck bushing 2A1, and ring 2A2, and the gland packings 3A, 3B, 3C are partially dislocated in the axial direction by the cooperation of both dislocating parts $2a_{1x}$, $2b_{1x}$.

Besides, since the upper surface of the ring 2A2 is formed flat, a conventional one having a flat holding surface may be used as the packing gland 2B.

Figure 7:
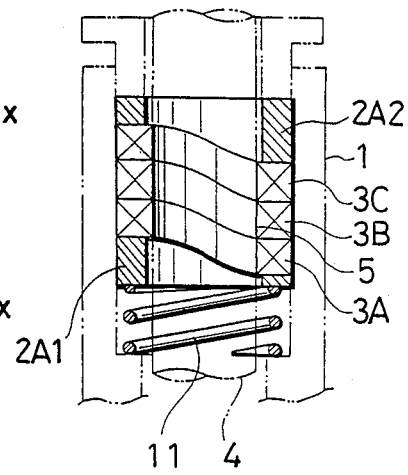
FIG. 7 is a sectional view of an essential part showing a fifth embodiment of the structure of a gland packing box according to this invention.

FIG. 7 denotes a fifth embodiment of this invention, in which a coil spring 11 is inserted between the neck bushing 2A1 and the deep end of the packing box 1, and this spring force is always applied through the neck bushing 2A1 to thrust the gland packings 3A, 3B, 3C in the axial direction.

Therefore, since the gradual stress relaxation occurring in the gland packings 3A, 3B, 3C can be compensated by the spring force of the coil spring 11, so that deterioration of sealing performance of the seal part 5 may be effective prevented to extend service life.

Figure 9:
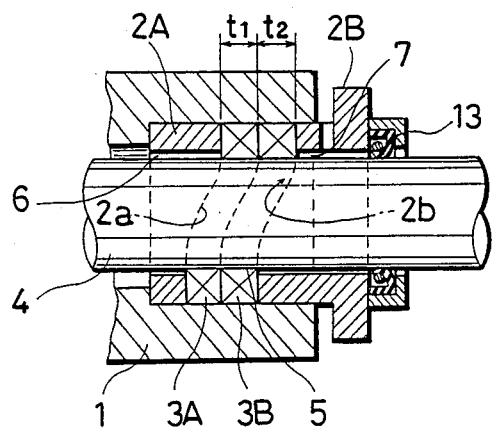
FIG. 9 is a sectional view showing a sixth embodiment of the structure of a gland packing box according to this invention.

FIG. 9 represents a sixth embodiment of this invention, and is a sectional view for applying this invention into a device having a horizontal shaft (for example, a horizontal pump).

In the case of a horizontal shaft, the fluid escaping from the seal surface does not stay in the gap 7 but is discharged outside. To prevent this, an auxiliary seal 13 is utilized.

This auxiliary seal 13 may be either the shown lip seal or a gland packing.

Meanwhile, such an embodiment as in FIG. 9 may be similarly applied when the embodiments shown in FIG. 3, FIG. 5, FIG. 6, and FIG. 7 are used in horizontal shaft devices.

Figure 10:
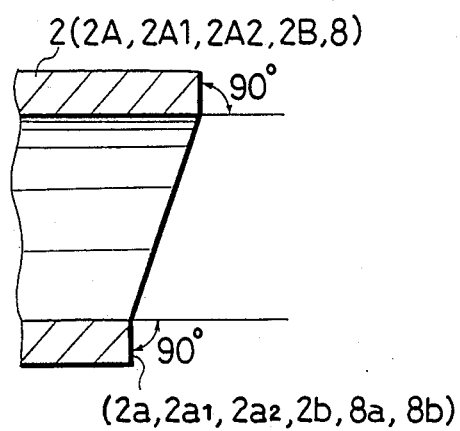
FIG. 10 is a sectional view of essential parts for explaining the fitting face of the gland packing holding member according to this invention.

FIG. 10 is a sectional view of essential parts to explain that the fitting faces 2a, $2a_1$, $2a_22$; 2b, 8a, 8b of the gland packing holding member 2 (composed of neck bushings 2A, 2A1, 2A2, packing gland 2B and lantern ring 8) are formed at an angle of 90 degrees with respect to the axial direction in the whole circumferential direction. That is, in this embodiment, by forming each fitting face at an angle of 90 degrees to the axial direction in the circumferential direction, the end faces of the gland packings 3A, 3B, 3C are pressed uniformly in the peripheral direction. That is, it is intended to prevent an uneven sealing state in the peripheral direction due to uneven pressing of the end faces of the gland packings 3A, 3B, 3C in the peripheral direction.

Figure 11:
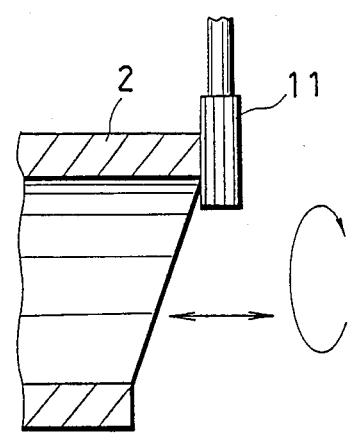
FIG. 11 is a schematic diagram for explaining the forming method of the fitting face shown in FIG. 10.

To form such fitting faces $2a$, $2a_1$, $2a_2$, $2b$, $8a$, $8b$, for instance as shown in FIG. 11, the gland packing holding member 2 is moved reciprocally in the horizontal direction while rotating in one direction by means of a milling machine, and one end of the gland packing holding member 2 is machined by the cutter 11, so that the entire circumference may be easily formed in an angle of 90 degrees.

Figure 12A:
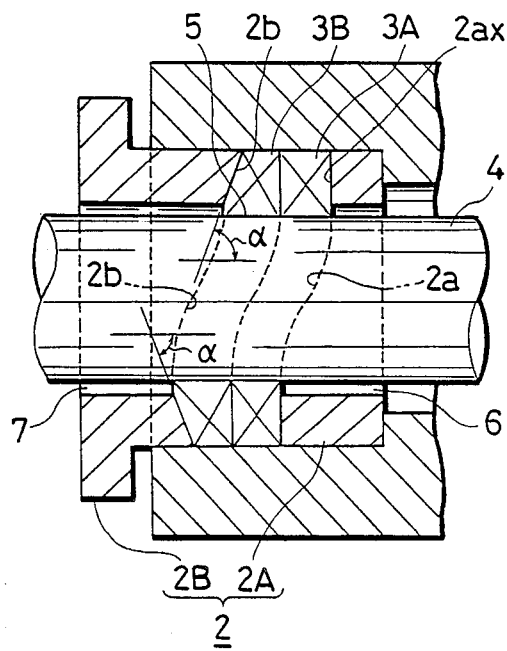
FIG. 12A and FIG. 12B are sectional views showing modified examples of the fitting face.
Figure 12B:
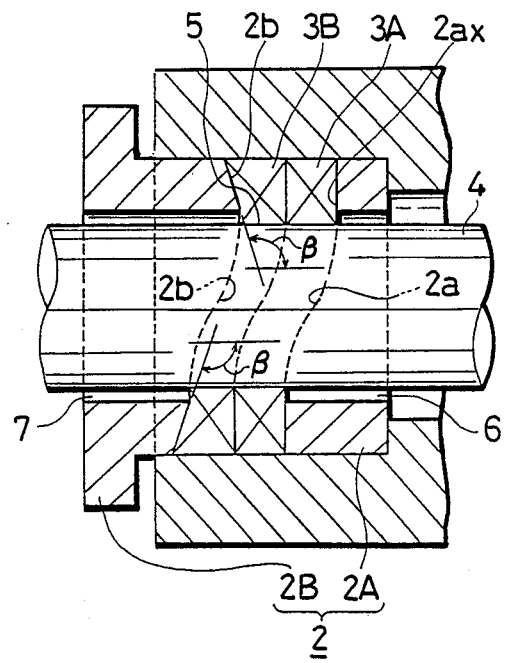

FIG. 12A, and FIG. 12B are sectional views of essential parts showing other modifications of the fitting faces. FIG. 12A is intended to increase the sealing force at the inner side of the gland packings 3A, 3B greater than the sealing force at the outer side by tapering the entire circumference of the fitting face $2b$ of the packing gland 2A a similar angle of $\alpha$ inward in the radial direction, whereas FIG. 12B is intended, to the contrary, to increase the sealing force at the outer side of the gland packings 3A, 3B greater than the sealing force at the inner side by tapering the entire circumference of the fitting face $2b$ of the packing gland 2B a similar angle of $\beta$ outward in the radial direction. Such a tapering process of the entire circumference of the fitting face $2b$ a similar angle may be easily achieved by inclining the cutter 11 of the milling machine at a specified angle. Meanwhile, needless to say, this tapering of the fitting face may be applied not only to the packing gland 2B, but also to other gland packing holding member, such as fitting faces of the neck bushing and lantern ring.

Figure 13:
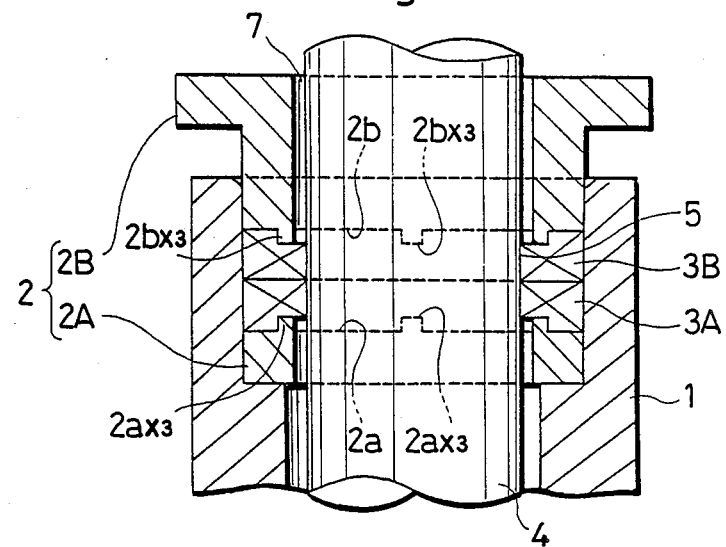
FIG. 13 is a sectional view showing a seventh embodiment of the structure of a gland packing box according to this invention.
Figure 14:
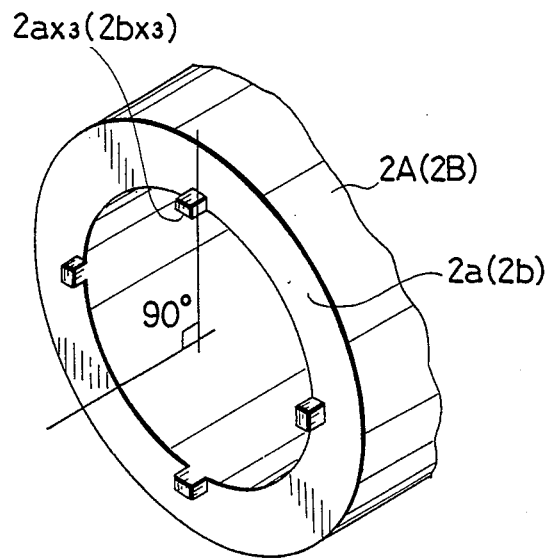
FIG. 14 is a partial perspective view showing an essential part of the gland packing holding member in FIG. 13.

FIG. 13 shows a seventh embodiment of this invention, in which fitting faces $2a$, $2b$ of the neck bushing 2A and packing gland 2B to comprising the gland packing holding member 2, are formed at an angle of 90 degrees to the axial direction on the whole circumferential surface as shown also in FIG. 14, while plural (four in the drawing) projecting dislocating parts $2ax_3 \ldots$, $2bx_3 \ldots$ for deviating the gland packings 3A, 3B inward in the axial direction are formed at specified intervals in the peripheral direction.

Even in such dislocating parts $2ax_3 \ldots$, $2bx_3 \ldots$, the gland packings 3A, 3B are dislocated inward in the axial direction at four positions in the circumferential direction, and the tiny annular gap 6 formed between the inside of the neck bushing 2A and the outside of the rotary shaft 4 overlaps with the inner peripheral surface of the gland packing 3A not dislocated inward in the axial direction in the circumferential direction. Besides, the tiny gap 7 at the side of packing gland 2B also overlaps with the inner surface of the gland packing 3B not dislocated inward in the axial direction in the circumferential direction.

Therefore, in this case, too, similar to the construction shown in FIG. 3, the escaping fluid is forced to be sent into the inner surface of the gland packing 3A along with the rotation of the rotary shaft 4, while the fluid escaping into the lower part of the tiny annular gap 7 through the seal part 5 is forced to be sent into the inner surface of the gland packing 3B along with the rotation of the rotary shaft 4, so that the lubricating function and cooling function may be enhanced.

Experimental Examples

Figure 8A:
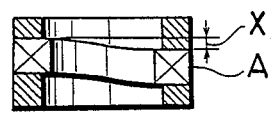
FIG. 8A is a sectional view of an experimental sample according to this invention.
Figure 8B:
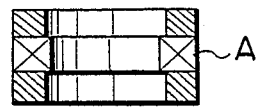
FIG. 8B is a sectional view of a conventional experimental sample.

As the structure of the gland packing box of the shaft seal part of a rotary shaft in a horizontal pump, the product of this invention shown in FIG. 8a and the conventional product shown in FIG. 8b were compared, and the results of measurements of fluid leak, gland part heating temperature and dynamic torque are shown in Table 1. Meanwhile, in FIG. 8a, X denote the distance of dislocation in the axial direction.

The test conditions were as follows:

(1) Sample gland packing A
Carbide fiber Teflon impregnated packing.
(2) Gland packing size
Inside diameter 32 mm × outside diameter 48 mm × 8 mm square.
In the case of the product of this invention, the displacement X was 4 mm.
(3) Fluid
Industrial water (2 kg/cm$^2$).
(4) Rotating speed
1800 rpm (V=3 m/s).

In the test, using a spring, tightening face pressures of 5 kg/cm$^2$ and 10 kg/cm$^2$ were applied to the sample gland packing A.

TABLE 1

| | Sample | | | |
|---|---|---|---|---|
| | Product of the invention | | Conventional product | |
| | Tightening pressure | | | |
| | 5 kg/cm$^2$ | 10 kg/cm$^2$ | 5 kg/cm$^2$ | 10 kg/cm$^2$ |
| Leak (cc/min) | 20 | 0.4 | 2 | 0 |
| Gland temperature (°C.) | 26 | 33 | 33 | 60 |
| Dynamic torque (kg-cm) | 1.0 | 2.3 | 1.7 | 8.1 |

As is clear from Table 1, in the structure of the gland packing box of this invention, a sufficient leak flow necessary for exhibiting the excellent lubricating function and cooling function could be maintained, and if the tightening face pressure was increased to 10 kg/cm$^2$, the leak was not reduced to zero, so that sliding resistance and heat generation could be effectively inhibited.

By contrast, in the conventional structure of a gland packing box, the leak was small, and the sliding resistance and heat generation increased significantly, and when the tightening face pressure was increased to 10 kg/cm$^2$, in particular, the leak became zero, which led to seizure.

Figure 15:
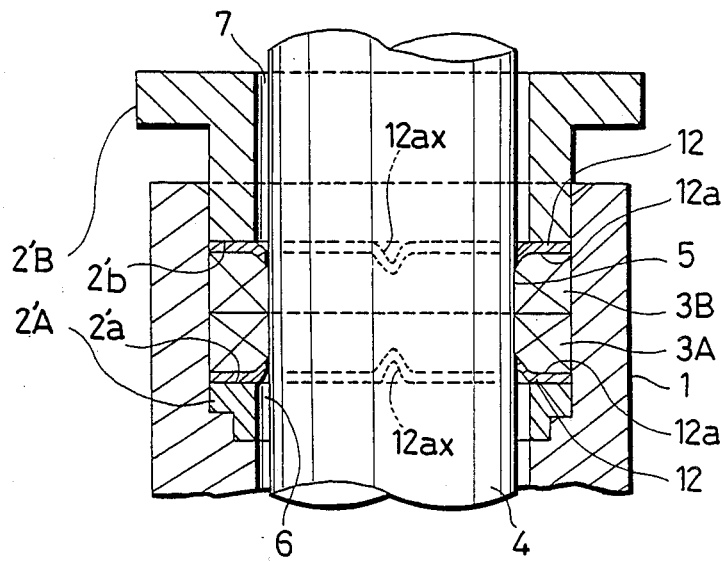
FIG. 15 is a sectional view showing an eighth embodiment of the structure of a gland packing box according to this invention.

FIG. 15 shows an eighth embodiment of this invention, in which a gland packing holding member 2' is composed of a neck bushing 2'A inserted deep in the packing box 1, a packing gland 2'B with its end fitted into the opening in the packing box 1, gland packings 3A, 3B externally mounted on a rotary shaft 4 and held in the axial direction through plate-shaped members 12, 12 by means of the neck bushing 2'A and packing gland 2'B.

That is, one end in the axial direction of the gland packing 3A abuts against the fitting face 12a of the plate-shaped member 12 disposed on the fitting face 2'a of the neck bushing 2'A, while the other end in the axial direction of the gland packing 3B abuts against the fitting face 12a of the plate-shaped member 12 disposed on the fitting face 2'b of the packing gland 2'B. By tightening the packing gland 2'B with a specified tightening pressure by a tightening machine (not shown) in the direction of the neck bushing 2'A, the inside of the gland packings 3A, 3B are brought into tight contact with the outside of the rotary shaft 4, thereby forming a seal part 5 between the inside of the gland packings 3A, 3B and the outside of the rotary shaft 4.

Figure 16:
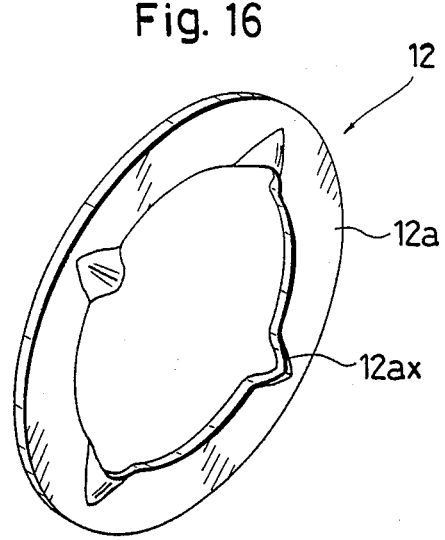
FIG. 16 is a perspective view of a plate-shaped member of FIG. 15.

The plate-shaped member 12 is made of a metal plate, and at its fitting face 12a side, as specifically shown in FIG. 16, plural (four in the embodiment) dislocating parts 12ax for dislocating the gland packings 3A, 3B in the axial direction are formed at specified intervals by press forming.

Therefore, since the gland packings 3A, 3B are held by the fitting faces 12a, 12a of a pair of plate-shaped members 12, 12 having the dislocated parts 12ax, they are partly dislocated in the axial direction by the portion of the projection of the dislocating parts 12ax of the plate-shaped members 12.

Accordingly, the tiny annular gap 6 formed between the inside of the neck bushing 2'A and the outside of the rotary shaft 4 is extended to the dislocated portion in the axial direction, and this portion of this extended gap 6 and the inner surface of the gland packing 3A not dislocated in the axial direction overlap with each other in the circumferential direction. As a result, the fluid in the gap 6 is forced to be sent into the inner surface of the gland packing 3A not dislocated in the axial direction along with the rotation of the rotary shaft 4, so that the lubricating function and cooling function are enhanced.

On the other hand, the tiny annular gap 7 formed between the inside of the packing gland 2'B and the outside of the rotary shaft 4 is extended to the portion partly dislocated in the axial direction of the gland packing 3B by the dislocating parts 12ax of the plate-shaped members 12, and this portion of the extended gap 7 and the inner surface of the gland packing 3B not dislocated in the axial direction overlap with each other in the circumferential direction. Therefore, the fluid escaping into the tiny annular gap 7 from the neck bushing 2'A side through the seal part 5 is forced to be sent into the inner surface of the gland packing 3A not dislocated in the axial direction along with the rotation of the rotary shaft 4, so that this portion may be lubricated and cooled effectively.

Figure 17:
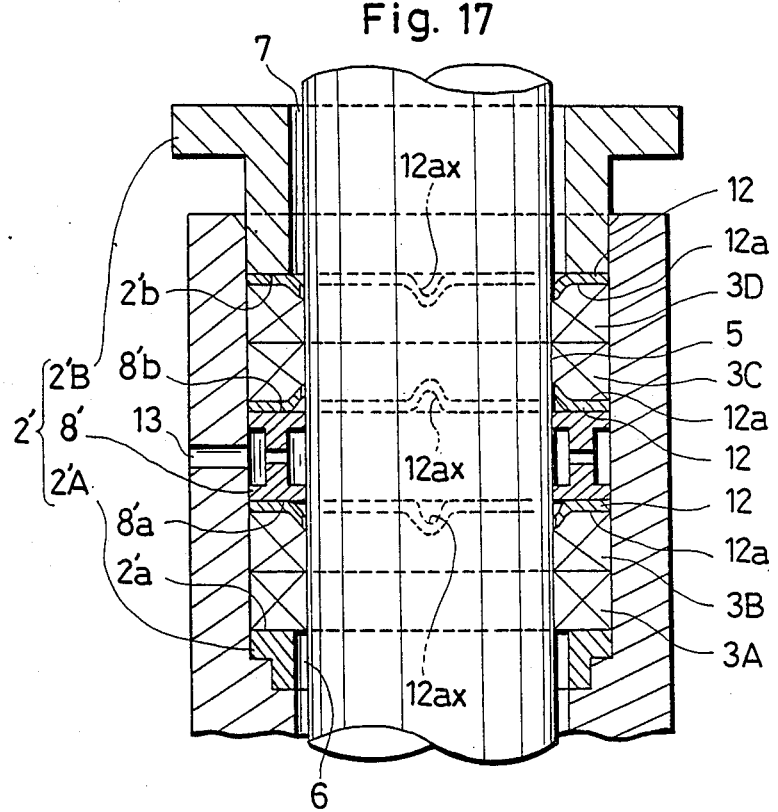
FIG. 17 is a sectional view showing a ninth embodiment of the structure of a gland packing box according to this invention.

FIG. 17 shows a ninth embodiment of this invention, in which four gland packings 3A, 3B, 3C, 3D are used, and a lantern ring 8' is placed between the gland packings 3B and 3C, and a gland packing holding member 2' is composed of neck bushing 2'A, packing gland 2'B and lantern ring 8', while plate-shaped members 12, 12, 12 are disposed on a fitting face 2'b of the packing gland 2'B and both fitting faces 8'a, 8'b of the lantern ring 8' so as to partly dislocate in the axial direction the gland packings 3B, 3C, 3D by means of their dislocating parts 12ax . . . As thus constructing, the sealed fluid charged into the lantern ring 8' through the feed passage 13 is forced to be sent into the inner surface of the gland packings 3B, 3C, 3D not dislocated in the axial direction, and the lubricating function and cooling function may be effectively exhibited even if the overall length of the seal part 5 is long.

Figure 18:
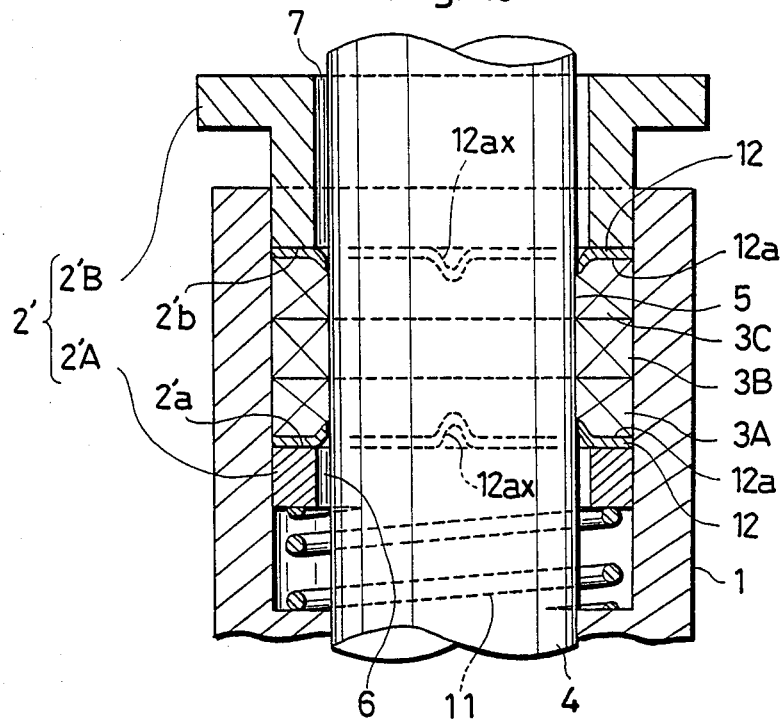
FIG. 18 is a sectional view showing a tenth embodiment of the structure of a gland packing box according to this invention.

FIG. 18 shows a tenth embodiment of this invention, in which a coil spring 11 is placed between a neck bushing 2'A and the deep end of the packing box 1, and its spring force is always applied to thrust the gland packings 3A, 3B, 3C in the axial direction through the neck bushing 2'A and plate-shaped member 12.

Therefore, since the gradual stress relaxation occurring in the gland packings 3A, 3B, 3C can be compensated for by the spring force of the coil spring 11, deterioration of the sealing performance of the seal part 5 can be effectively prevented, so that the source life may be extended.

Figure 19:
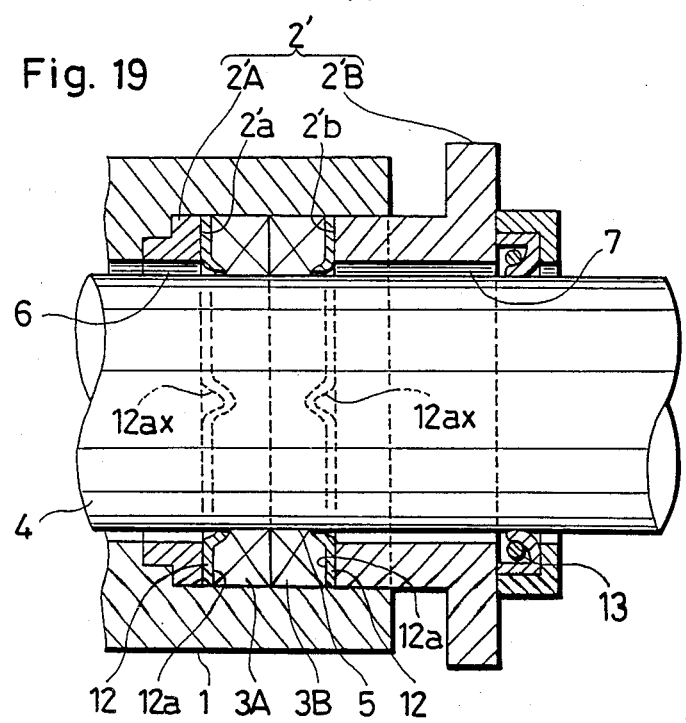
FIG. 19 is a sectional view showing an eleventh embodiment of the structure of a gland packing box according to this invention.

FIG. 19 shows an eleventh embodiment of this invention, relating to a structure of a gland packing box for dislocating partly the gland packing in the axial direction by using a plate-shaped member 12, and this is a sectional view of an application into a device having a horizontal shaft (for example, a horizontal pump).

The fluid escaping the seal surface 5, in the case of a horizontal shaft, does not stay in the gap 7 but is discharged outside. Accordingly, as a means of preventing it, an auxiliary seal 13 is disposed the same as in FIG. 9.

The auxiliary seal 13 to be used here may be either the shown lip seal or a gland packing.

This embodiment may be similarly applied in the case of using the embodiment shown in FIG. 17 or FIG. 18 into a horizontal shaft device.

In those embodiments, the forming of the plate-shaped member 12 as a metal plate was explained, but, of course, this plate-shaped member may be integrally formed by synthetic resin or the like.

In the embodiment shown in FIG. 15, FIG. 17, FIG. 18 and FIG. 19, the lubricating function and cooling function of the seal part 5 is extremely enhanced by the dislocating parts 12ax . . . of the plate-shaped member 12, and the power loss may be inhibited as much as possible by preventing abnormal wear of the rotary shaft or seizure of the seal part due to dry operation. What is more, since the means for partly dislocating the gland packing in the axial direction is a plate-shaped member, it may be easily applied in a conventional structure of a gland packing box, and furthermore since it is enough to form dislocating parts in the plate-shaped member, manufacture is easy, the cost is low, and the practical effect is great.

What is claimed is:

1. A structure of a gland packing box, comprising:
   a packing box;
   a gland packing situated within the packing box for external mounting on a rotary shaft; and
   a gland packing holding member for holding the gland packing in the packing box in an axial direction, said gland packing holding member having a fitting face with at least one dislocating part for partly dislocating the gland packing in said axial direction, wherein the entire fitting face is located at an angle of 90° to said axial direction.

2. A structure of a gland packing box according to claim 1, wherein the gland packing holding member comprises a packing gland and a neck bushing.

3. A structure of a gland packing box according to claim 1 wherein the gland packing holding member comprises a packing gland, a lantern ring and a neck bushing.

4. A structure of a gland packing box according to claim 1, wherein the gland packing holding member comprises a neck bushing a packing gland and another ring, said ring being disposed between the gland packing and the packing gland fixed in the packing box.

5. A structure of a gland packing box according to claim 1 wherein the neck bushing is thrusted against the gland packing side of the structure by the spring member.

6. A structure of a gland packing box, comprising:
   a packing box;
   a gland packing situated within the packing box for external mounting on a rotary shaft; and
   a gland packing holding member for holding the gland packing in the packing box in an axial direction, said gland packing holding member having a fitting face with at least one dislocating part for partly dislocating the gland packing in said axial direction, wherein the entire fitting face is located at an angle to said axial direction, and wherein the gland packing holding member comprises a packing gland and a neck bushing.

7. A structure of a gland packing box, comprising:
   a packing box;
   a gland packing situated within the packing box for external mounting on a rotary shaft; and
   a gland packing holding member for holding the gland packing in the packing box in an axial direction, said gland packing holding member having a fitting face with at least one dislocating part for partly dislocating the gland packing in said axial direction, wherein the entire fitting face is located at an angle to said axial direction, and wherein the gland packing holding member comprises a packing gland, a lantern ring and a neck bushing.

8. A structure of a gland packing box, according to claim 7, further comprising:
   a spring member, and wherein the neck bushing is thrusted against the gland packing side of the structure by said spring member.

9. A structure of a gland packing box, comprising:
   a packing box;
   a gland packing situated within the packing box for external mounting on a rotary shaft; and
   a gland packing holding member for holding the gland packing in the packing box in an axial direction, said gland packing holding member having a fitting face with at least one dislocating part for partly dislocating the gland packing in said axial direction, wherein the entire fitting face is located at an angle to said axial direction, and wherein the gland packing holding member comprises a packing gland, a neck bushing and a further ring, said further ring being disposed between the gland packing and the packing fixed in the packing box.

10. A structure of a gland packing box, comprising:
   a packing box;
   a gland packing situated within the packing box for external mounting on a rotary shaft; and
   a gland packing holding member for holding the gland packing in the packing box in an axial direction, said gland packing holding member, having a fitting face with at least one dislocating part for partly dislocating the gland packing in said axial direction, wherein said at least one dislocating part comprises a plurality of projections formed at specified intervals.

11. A structure of a gland box, comprising:
   a packing box;
   a gland packing situated within the packing box for external mounting on means defining a rotary axis;
   a gland packing holding member for holding the gland packing in the packing box in an axial direction; and
   an annular metal plate-shaped member forming, by pressing at least one dislocating part for partly dislocating the gland packing in said axial direction, said at least one dislocating part being disposed between the gland packing and the gland packing holding member.

12. A structure of a gland packing box according to claim 11 wherein the neck bushing is thrusted against the gland packing side of the structure by the spring member.

13. A structure of a gland box, comprising:
   a packing box;
   a gland packing situated within the packing box for external mounting on means defining a rotary axis;
   a gland packing holding member for holding the gland packing in the packing box in an axial direction; and
   an annular plate shaped member forming a plurality of dislocating parts at equal intervals each partly dislocating the gland packing in said axial direction, said dislocating parts being disposed between the gland packing and the gland packing holding member.

14. A structure of a gland box, comprising:
   a packing box;
   a gland packing situated within the packing box for external mounting on means defining a rotary axis;
   a gland packing holding member for holding the gland packing in the packing box in an axial direction; and
   an annular plate-shaped member forming at least one dislocation part for partly dislocating the gland packing in said axial direction, said at least one dislocation being disposed between the gland packing and the gland packing holding member, wherein the gland packing holding member comprises a packing gland and a neck bushing, and wherein an annular plate-shaped member is disposed between the packing gland and the gland packing and another annular plate-shaped member is disposed between the neck bushing and the gland packing.

15. A structure of a gland packing box according to claim 14, further comprising:
   a spring member, and wherein the neck bushing is thrusted against the gland packing side of the structure by said spring member.

16. A structure of a gland box, comprising:
   a packing box;
   a gland packing situated within the packing box for external mounting on means defining a rotary axis;
   a gland packing holding member for holding the gland packing in the packing box in an axial direction; and
   an annular metal plate-shaped member forming, by pressing at least one dislocation part for partly dislocating the gland packing in said axial direction, said at least one dislocation being disposed between the gland packing and the gland packing holding member, wherein the gland packing holding member comprises a packing gland, a lantern ring and a neck bushing, and wherein an annular plate-shaped member is disposed between the packing gland and the gland packing and another annular plate-shaped member is disposed between the lantern ring and the gland packing.

* * * * *

UNITED STATES PATENT AND TRADEMARK OFFICE
CERTIFICATE OF CORRECTION

PATENT NO. : 4,844,479
DATED : July 4, 1989
INVENTOR(S) : Takahisa Ueda

It is certified that error appears in the above-identified patent and that said Letters Patent is hereby corrected as shown below:

Claim 3, line 59 after "claim 1" insert a --,--.

Claim 5, line 68 after "claim 1" insert a --,--.

Claim 12, line 8 after "claim 11" insert a --,--.

Claim 13, line 18 between "plate" and "shaped" insert -----.

Signed and Sealed this

Fifth Day of June, 1990

Attest:

HARRY F. MANBECK, JR.

*Attesting Officer*      *Commissioner of Patents and Trademarks*